(No Model.)  2 Sheets—Sheet 1.

A. C. SMITH.
ROPE CLUTCH AND COUPLING.

No. 547,896.  Patented Oct. 15, 1895.

Witnesses  
Everett Tyson.  
J. F. Badgerow.

Albert C. Smith, Inventor  
By his Attorney Lou. Vaughan (No Model.) 2 Sheets—Sheet 2.

A. C. SMITH.
ROPE CLUTCH AND COUPLING.

No. 547,896. Patented Oct. 15, 1895.

UNITED STATES PATENT OFFICE.

ALBERT C. SMITH, OF BLAIR, NEBRASKA, ASSIGNOR, BY MESNE ASSIGNMENTS, OF ONE-HALF TO JOHN McQUARRIE, OF SAME PLACE.

ROPE CLUTCH AND COUPLING.

SPECIFICATION forming part of Letters Patent No. 547,896, dated October 15, 1895.

Application filed March 26, 1895. Serial No. 543,267. (No model.)

*To all whom it may concern:*

Be it known that I, ALBERT C. SMITH, a citizen of the United States, residing at Blair, in the county of Washington and State of Nebraska, have invented a new and useful Rope Clutch and Coupling, of which the following is a specification.

My invention relates to an improved clutch for fastening the ends of clothes-lines, hammock-ropes, or the end of any rope or other pliable line, or as a clutch or take-up at any intermediate point on any such line, a further object being to provide a clutch certain in its action and harmless to the texture of the rope, as well as convenient to use.

I attain these objects by the mechanism illustrated in the accompanying drawings, in which—

Figure 1:
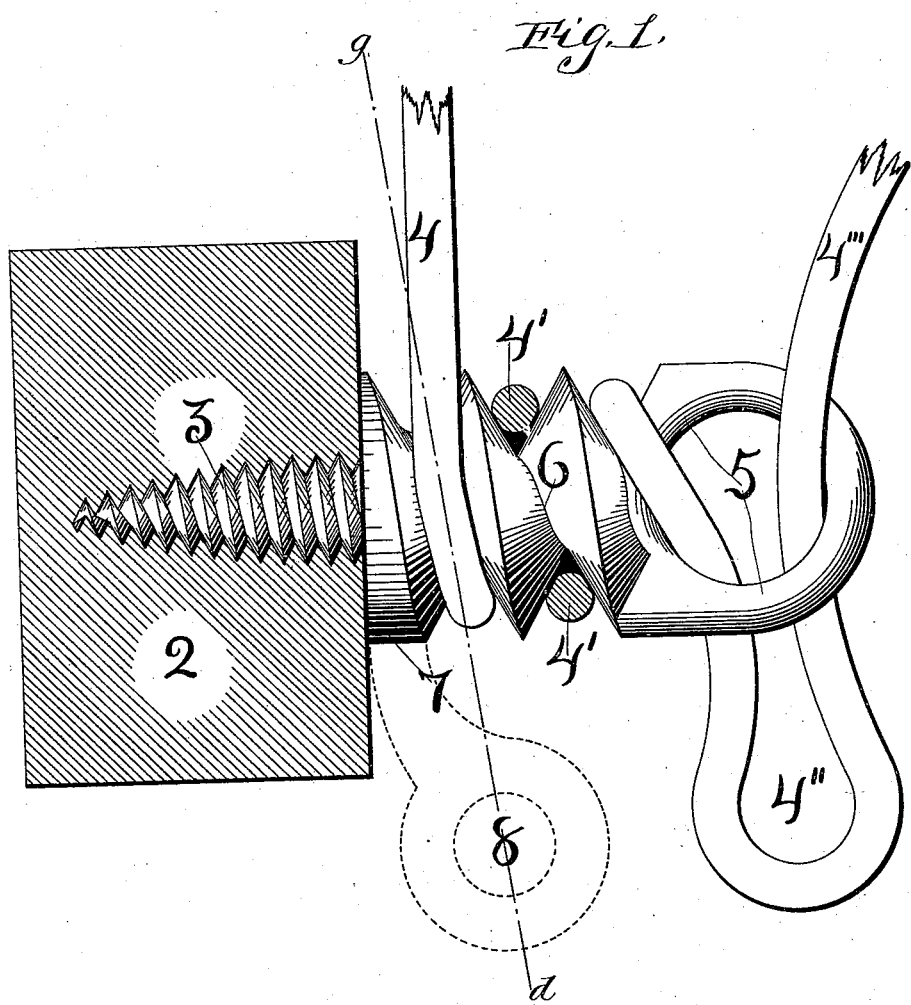
Figure 2:
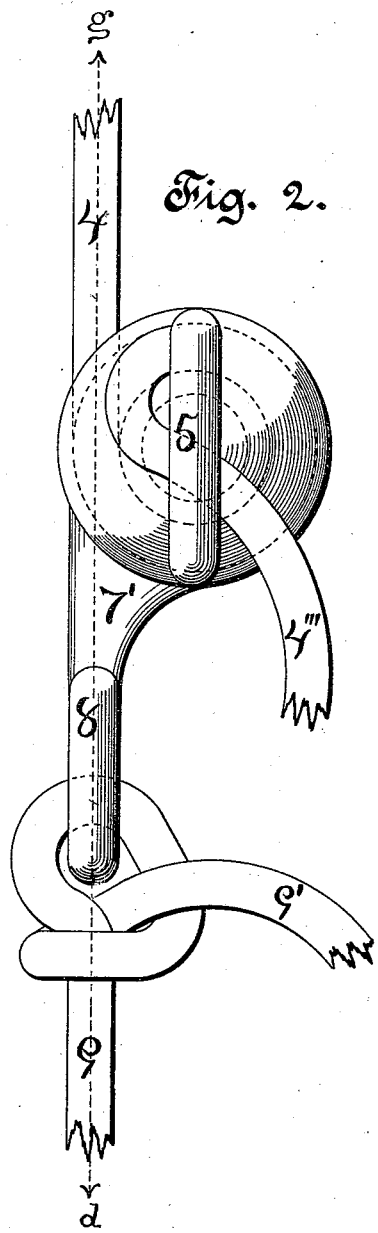

Figure 1 is a top view of my contrivance screwed to a post to fasten the end of a clothesline, and Fig. 2 is a view looking parallel with the axis of the circular or helicoidal body and at right angles to Fig. 1, showing the device applied as a rope-coupling.

Similar numerals refer to similar parts throughout both views.

A circular or helicoidal shaped body to form the spiral groove 6 of V shape cross-section has thereon the integral ring 5, and opposite thereto the integral base 7, with the integral attaching-screw 3, by which the device is fastened to the post 2. (Shown in section at the point of fastening.) In operation the rope 4 is wound in the groove 6, beginning at the base 7 and approaching the ring 5, through which the free end 4''' is passed to prevent the wind or other disturbing causes loosening the same. If the point of clutching the rope is remote from the end, then it may be passed through the ring double, as shown, forming the loop 4'', through which it may be relooped for further security. The ring 5 has a further use. By inserting through it a billet of wood or other lever, the screw 3 is turned into any wooden anchorage. The rope may be clutched without the ring by returning to and half-hitching it around the draft-line, but this is not as convenient as slipping it through the ring.

In Fig. 1 the rope as wound in the groove has half of one of its coils cut away to reveal the shape of the groove, and showing in section the cut ends 4' 4', also illustrating how the rope wedges into the V-shaped groove, which prevents it from slipping, clutching it firmer the greater the draft on the line 4, preserving the rope uninjured as the groove is continuous and smooth.

When the clutch is to be used as a rope-coupling, it has formed in an integral curved arm 7', projecting from the base, the eye 8, (indicated by broken lines in Fig. 1,) located directly opposite the direction of draft of the rope clutched and in range with the groove where the rope leaves the same, as indicated by the broken line *d g*, and its axis parallel with the axis of ring 5 to facilitate casting, as it is designed to make said clutches of cast or malleable iron. The end of the line to be coupled to is made fast in the eye 8, which sustains the clutch in position to receive and retain the rope 4. This eye 8 serves further use as a fastener for the clutch by engaging it with a staple or a sling where the use of the screw would be objectionable, and the clutch may be made with either or both screw 3 and eye 8, according to the use and requirements, without interfering with its clutching feature; also as a modification a broad base having perforations for common wood-screws may be used instead of the base 7 and the single fastening-screw 3. The range of uses of this contrivance, is large, among those not mentioned heretofore being its use to suspend releasably lines from ceilings or soffits. For instance, a swing may be supported by screwing a pair of clutches upward into a ceiling or door soffit and securing each end of the swing-rope by passing it first through the ring 5, then winding it upward in the groove 6 and inserting the end through the eye 8; also a clothes-line may be supported from a number of the clutches projecting downward from a ceiling into which the screws 3 are driven, the line extending from clutch to clutch and wound in the grooves of each, and at the end clutch inserted through the ring 5 to prevent uncoiling. Set in the prow of a boat it will shiftably engage an anchor-line along a shore or across a stream, and at any place where cleats are used for fastening ropes it furnishes a desirable substitute. It will be observed that a body of discal form with a single V groove opening radially outward from its curved edge could be used, but by the helicoidal form a more compact body giving the required length of groove is attained.

Having fully described my invention, what I claim as new, and desire to secure by Letters Patent, is—

1. In a rope clutch a circular body having an annular V shaped groove, an integral attaching screw, and a projecting ring substantially as described.

2. In a rope clutch and coupling a circular body having an annular V shaped groove opening radially, and an arm having an eye substantially as described.

3. In a rope clutch and coupling a helicoidal body having a V shaped spiral groove, a projecting ring and an arm having an eye substantially as described.

4. In a rope clutch and coupling a helicoidal body to form a V shaped spiral groove, said body having projected radially therefrom an integral curved arm having an attaching eye in line with the groove where it is entered by the rope clutched substantially as described.

Signed at Blair, in the county of Washington and State of Nebraska, this 16th day of March, 1895.

ALBERT C. SMITH.

Witnesses:
U. S. CAIN,
J. F. BADGEROW.